United States Patent
Shurki et al.

(10) Patent No.: US 10,666,364 B2
(45) Date of Patent: May 26, 2020

(54) OPTICAL ELECTRICAL INTERFACE DEVICE, ELECTRICAL MODULE DEVICE AND SYSTEM FOR COUPLING TO AN OPTICAL DISTRIBUTION NETWORK

(71) Applicant: Corning Optical Communications LLC, Hickory, NC (US)

(72) Inventors: Roni Aharon Shurki, Modiin (IL); Martin Spreemann, Berlin (DE)

(73) Assignee: Corning Optical Communications LLC, Charlotte, NC (US)

( * ) Notice: Subject to any disclaimer, the term of this patent is extended or adjusted under 35 U.S.C. 154(b) by 0 days.

(21) Appl. No.: 15/771,172

(22) PCT Filed: Oct. 5, 2016

(86) PCT No.: PCT/US2016/055494
§ 371 (c)(1),
(2) Date: Apr. 27, 2018

(87) PCT Pub. No.: WO2017/074669
PCT Pub. Date: May 4, 2017

(65) Prior Publication Data
US 2018/0331767 A1   Nov. 15, 2018

(30) Foreign Application Priority Data

Oct. 27, 2015 (EP) .................................. 15191690

(51) Int. Cl.
*H04B 10/80* (2013.01)
*H04B 10/272* (2013.01)
(Continued)

(52) U.S. Cl.
CPC ............ *H04B 10/808* (2013.01); *G02B 6/42* (2013.01); *H04B 10/07955* (2013.01); *H04B 10/272* (2013.01); *H04Q 2213/1301* (2013.01)

(58) Field of Classification Search
CPC .................................................. H04B 10/808
See application file for complete search history.

(56) References Cited

U.S. PATENT DOCUMENTS 5,301,057 A   4/1994   Eames
8,411,696 B1   4/2013   Ko et al.
(Continued)

FOREIGN PATENT DOCUMENTS

EP        2830302 A1     1/2015

OTHER PUBLICATIONS

"2×2 2.4/5GHZ 11AC Minipcie Radio"; Compex, Oct. 13, 2014; 3 Pages.
(Continued)

*Primary Examiner* — Shi K Li
(74) *Attorney, Agent, or Firm* — Tamika A. Crawl-Bey

(57) ABSTRACT

An optical-electrical interface device for coupling to an optical distribution network is provided which comprises: a housing, an optical fiber port for coupling to a single optical fiber, an optical network terminal unit connected to the optical fiber port, a power sourcing management unit configured to manage the power supply of the optical network, network terminal unit, a plurality of electrical ports and a plurality of electrical cables each connected to the power sourcing management unit and to one of the electrical ports. The electrical ports are accessible and/or arranged outside the housing, wherein the optical-electrical interface device is configured to reverse-feed electrical power, from external electrical module devices connected to the electrical ports, for operating the optical network terminal unit which is arranged inside the housing. The power sourcing management unit is configured to calculate and/or control shares of electrical power received and/or to be received via the electrical cables from external electrical module devices, (Continued)

dependent on the number of external electrical module devices connected to one, some or all of the electrical ports.

12 Claims, 10 Drawing Sheets

(51) Int. Cl.
*G02B 6/42* (2006.01)
*H04B 10/079* (2013.01)

(56) References Cited

U.S. PATENT DOCUMENTS

| | | | |
|---|---|---|---|
| 8,601,289 | B1 | 12/2013 | Smith et al. |
| 8,615,168 | B2 | 12/2013 | Anschutz |
| 8,818,192 | B1 | 8/2014 | Smith et al. |
| 9,787,400 | B2 | 10/2017 | Bourg et al. |
| 2005/0191053 | A1* | 9/2005 | Levinson ............ H04B 10/801 398/25 |
| 2006/0228117 | A1 | 10/2006 | Takeuchi et al. |
| 2010/0150556 | A1 | 6/2010 | Soto et al. |
| 2011/0274433 | A1 | 11/2011 | Presi et al. |
| 2014/0314412 | A1 | 10/2014 | Soto et al. |
| 2015/0078756 | A1 | 3/2015 | Soto et al. |
| 2015/0131993 | A1 | 5/2015 | Lutgen |
| 2015/0304508 | A1* | 10/2015 | Peker ............ H04M 19/003 379/24 |
| 2016/0261556 | A1* | 9/2016 | Zheng ............ H04L 45/745 |

OTHER PUBLICATIONS

"Highly Optimized GPON ONT Soc With Dual-Core Process and Soft-DSP for High Performance, Low Cost GPON+VOIP SFU/HGU Applications"; Product Brief 5VT2510 GPON ONT Soc Family, Product Brief, 5VTECHNOLOGIES; Date Unknow.

EP15191690.5 Office Action dated May 9, 2016; 9 Pages; European Patent Office.

International Search Report and Written Opinion of the International Searching Authority; PCT/US2016/055494; dated Dec. 30, 2016; 17 Pages.; European Patent Office.

Von Schierstaedt; "Chip Innovations Drive Deployment of GPON Inffrastructure"; LANTIQ; 9 Pages; 2013.

* cited by examiner

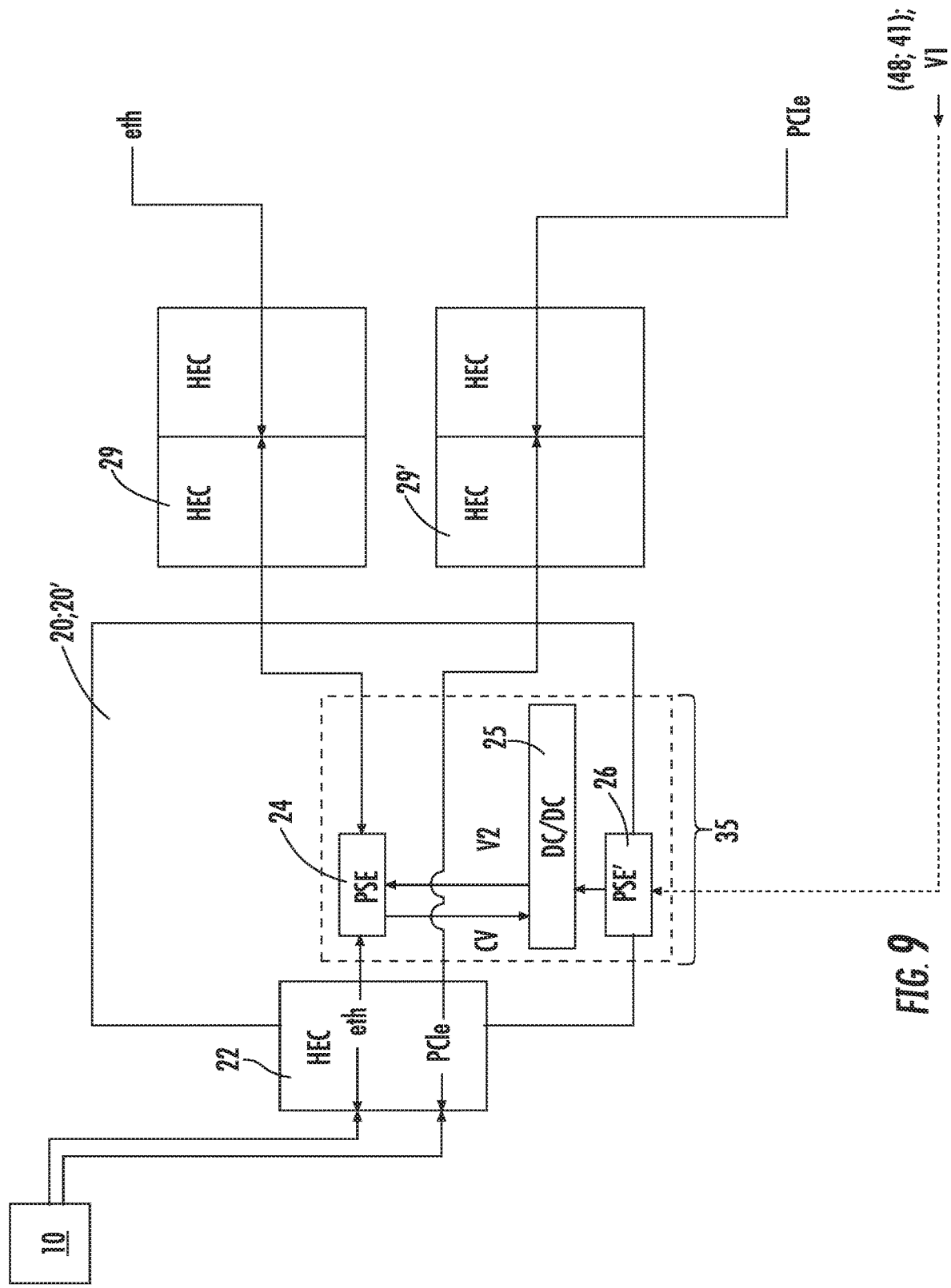

OPTICAL ELECTRICAL INTERFACE DEVICE, ELECTRICAL MODULE DEVICE AND SYSTEM FOR COUPLING TO AN OPTICAL DISTRIBUTION NETWORK

CROSS REFERENCE TO RELATED APPLICATIONS

This application claims the benefit of priority of EP Patent Application Serial No. 15191690.5, filed Oct. 27, 2015 and International Application No. PCT/US16/55494, filed Oct. 5, 2016, the content of which is relied upon and incorporated herein by reference in its entirety.

BACKGROUND

There exists various deployment schemes for bridging the distance between an optical fiber network and a plurality of customer premises. i.e. subscriber locations, and/or or further devices to be accessed by and/or coupled to the optical fiber network. According to the concept of 'fiber to the home' (FTTH), each customer premise should be accessed by the optical fiber network directly, with optical fibers reaching into the home of the respective customer. However, since this will entail significant costs for installing optical fibers to each customer premise, other deployment schemes than fiber to the home are more prevalent; especially due to the already existing electrical networks accessing most buildings, apartments or other device locations.

This application refers to any of the following deployment schemes in which at least a part of the distance between the optical network and the customer premises is bridged by electrical signals, be it wired, i.e. wire-bound, or wireless. The system called 'fiber to the building' or 'fiber to the premise' (FTTB/FTTP) uses legacy copper wires inside the buildings or premises for coupling to the optical fibers, which fibers must reach these buildings or premises.

According to 'fiber to the curb' (FTTC) as well as according to 'fiber to the distribution point' (FTTdP), for example, the endpieces of optical fibers of a network which approach closest to the respective customer premise are accessible in distribution points, such as street cabinets, handholes, manholes, or other compartments either buried underground or disposed above ground; plural endpieces of optical fibers are accessible there for coupling to an electrical network connecting the customer premises. For instance, the urban or rural power supply system with high alternating current voltages of 110 V and 220 V may be used as well as regional/local power supply nets with medium or low voltage, or electrical telecommunication networks (including coaxial cable networks). Particularly in case of wired networks which mostly comprise copper lines, i.e. copper cables accessing each household, basement or building, the legacy copper lead-in infrastructure may be used for bridging the distances between a distribution point, i.e. access location of an optical distribution fiber network, and the customer premises.

Likewise, wireless modules, devices and/or networks may also be used for transmitting the high-frequency data signals between an access location of the optical distribution network and the customer premises. The exploited electrical communication networks may include wireless transceivers, such as antennas, aerials, electrical transmission towers, small cell radio access nodes, Ethernet bridged WiFi modules, WiFi point-to-point connections between paired wireless modules, or other electrical transmission devices.

For transmitting high frequency signals of telecommunication services, for example, especially at high bandwidths in modern broadband services, by means of an existing electrical wire-bound or wireless network, diverse electrical modulation techniques are applied, such as DSL, VDSL, VDSL2, G.fast, cable modem protocols or other conversion technologies by which the data format and/or data protocol is changed.

The present application is applicable to any of these deployment schemes, concepts, wire-bound and wireless networks, customer premises and other devices.

According to most of the above deployment schemes, a respective distribution point, i.e. access location where an endpiece of an optical fiber is accessible, must be provided with electrical power, since the optical distribution network per se does supply electrical power and since an optical network terminal unit to be coupled to a fiber endpiece requires power supply for being operated. Accordingly, the already existing, legacy electrical networks are commonly not only used for transmitting as well as modulating the high-frequency telecommunication data to be transmitted, but also for supplying electrical power, by reverse-feeding, to the optical network terminal unit coupled to a fiber endpiece at an access point of the optical distribution network.

Accordingly, any optical-electrical interface device optically coupled to a respective fiber endpiece is driven by electrical power supplied from the subscriber premises or other power source units connected to it over a small or, in most cases, large distance. A power sourcing management unit, such as a microcontroller, calculates the share of electrical power to be drained and reverse-fed from each client permanently connected, by means of electrical hardware comprising a reverse power feeder at the customer premise, to the optical-electrical interface device so as to contribute and pay the proper share of power consumption needed by an interface device connected to plural customers, users or subscribers. In such multi-user optical-electrical interface devices representing multi-port devices, one single optical port is coupled to a fixed number of electrical ports, for instance to 4, 8, or 16 electrical ports.

Conventionally, a multi-port interface device comprises one respective electrical module device, i.e. an electrical converter module for each user, which is required for converting the electrical signals according to a modulation protocol, such as DSL, VDSL, VDSL2, G.fast, or coaxial cable modem protocol, for instance. Electrical transmission of telecommunication data, between the multi-port optical-electrical interface device and the connected subscriber premises, is then executed according to the respective protocol. For example, in the housing of a multi-port optical-electrical interface constructed for connecting 16 customer premises to an optical fiber, there are 16 VDSL-converter modules comprised in the housing, of which some or all can be used simultaneously. Usually plural of such multi-port interface devices are installed in a street cabinet, manhole or handhole or another kind of the distribution point, so that pluraly kinds of electrical converter modules may be installed in a street cabinet, manhole or handhole.

Often, the number of users, i.e. customer premises connected to a particular interface device is smaller than the number of electrical converter modules provided in the interface device housing. These users then combinedly share, i.e. reverse-feed the electrical power consumed by this interface device. Although its power consumption includes the electrical power for operating all converter modules inside the housing, including the power for accessing the unused converter modules, the power consumption of such a conventional multi-port interface device is still lower than that of a corresponding plurality of individual single-port interface devices, which are also being installed at these distribution points. Moreover, such a multi-port interface device is smaller, in total size, than a corresponding number of single-port interface devices.

On the other hand, such conventional single-port optical-electrical interface devices have other benefits; they are powered individually by each respective subscriber alone, since no power supply sharing is needed. Furthermore, they are rather small since they comprise only one electrical converter module; thus they maybe more easily installed in the size-constrained compartments of a street cabinet, manhole, handholes or another kind of distribution point in which the space is readily filled with other optical-electrical interface devices and legacy copper wires of electrical networks connected to them. Furthermore, plural single-port interface devices are more easily selected according to the liking of each subscriber, and combinedly installed, thereby combining different broadband data conversion protocol technologies (such as VDSL or the like, see above) within one distribution point, simply by selecting and installing the single-port interface devices constructed for the respective conversion protocol technology.

However, so far there exists no interface device or interface system for reconciling the benefits of single-port devices and multi-port devices with one another. There is a need for an optical-electrical interface device which allows an easier implementation of the bridging technology, i.e. electrical modulation techniques, subscribed by the customer premises connected to the distribution point. Furthermore, it might be desirable to more easily increase the number of customer premises connectable to a single optical fiber. Beyond that, it could be desirable to further reduce the power consumption at distribution points, even below the power consumption currently achievable by the use of multi-port interface devices.

TECHNICAL FIELD

The application refers to an optical-electrical interface device for coupling to an optical distribution network. The application further refers to an electrical module device, particularly to an electrical converter module, and to a system comprising the optical-electrical interface device and at least one electrical module device or converter module device connected to the optical-electrical interface device.

In the field of telecommunication and other broadband communication services which in-volve the use of an optical distribution network comprising optical fibers, high-frequency data signals are transmitted between the optical fiber network and a plurality of customer premises, data processing units and/or other electronic devices which are configured for electrical communication, rather than optical communication.

SUMMARY

The present application provides an optical-electrical interface device for coupling to an optical distribution network. The optical-electrical interface device may include a housing, an optical fiber port for coupling to a single optical fiber, an optical network terminal unit connected to the optical fiber port, a power sourcing management unit configured to manage the power supply of the optical network terminal unit, a plurality of electrical ports and a plurality of electrical cables each connected to the power sourcing management unit and to one of the electrical ports. In some embodiments, the optical network terminal unit and the power sourcing management unit are arranged inside the housing and the electrical ports are accessible and/or arranged outside the housing. In some embodiments, the optical-electrical interface device is configured to reverse-feed electrical power, from external electrical module devices connected to the electrical ports, for operating the optical network terminal unit. In yet other embodiments, the power sourcing management unit is configured to calculate and/or control shares of electrical power received and/or to be received via the electrical cables from external electrical module devices, dependent on the number of external electrical module devices connected to one, some or all of the electrical ports.

BRIEF DESCRIPTION OF THE DRAWINGS

Exemplary embodiments are herein below described with reference to the drawings.

FIG. 9 shows an alternative embodiment of a modular device coupleable to the optical-electrical interface device.

DETAILED DESCRIPTION

Figure 1:
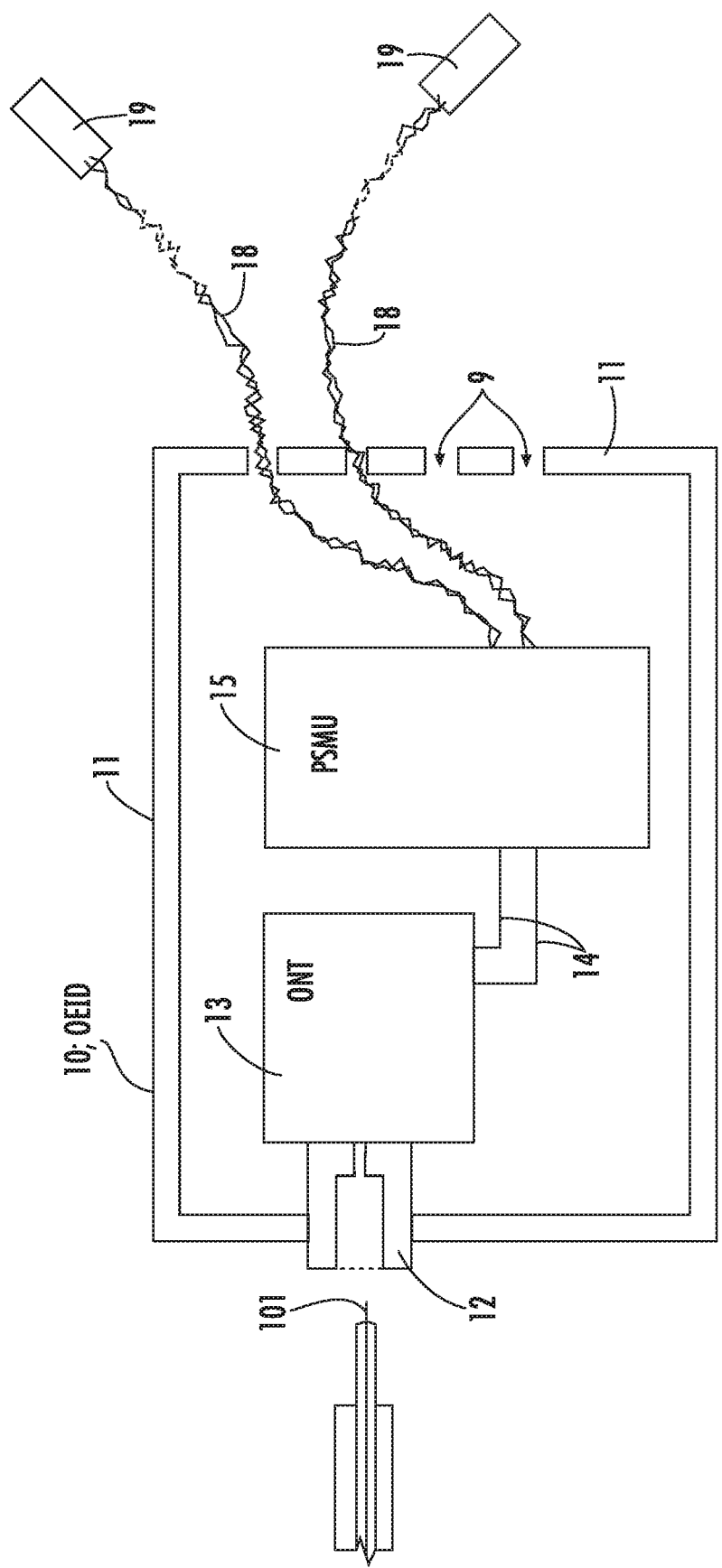
FIG. 1 shows a schematic cross-sectional view of an embodiment of an opto-electrical interface device.

According to the application, the optical-electrical interface device comprises a housing and the optical network terminal unit and the power sourcing management unit integrated in it. However, in contrast to any conventional single-port or multi-port interface device, the interface device of the application does not comprise any electrical converter module connected to the power sourcing management unit, to the optical network terminal unit or integrated in the housing. Instead, the interface device proposed here is an interface device configured for external electrical conversion, by another respective electrical converter module, which may be coupled to the interface device from outside.

Accordingly, the optical-electrical interface device, or its housing, respectively, does not comprise any electrical converter module. Rather, it comprises electrical ports accessible outside the housing and electrical cables connecting these ports to the housing and/or to the power sourcing management unit arranged inside the housing. Along the entire length of the respective electrical cable, any telecommunication data or other kinds of high-frequency and/or broadband data are transmitted, between the power sourcing management unit inside the housing and the electrical port outside the housing, without any intermediate electrical conversion. The plural, that is at least two electrical cables, thus enable the execution of any kind of electrical conversion outside the optical-electrical interface device, rather than inside the optical-electrical interface device as provided conventionally.

Turning the location where the electrical conversion is to be executed from inside the interface device and its housing, as conventionally practiced, to outside the interface device or its housing, paves the way for new and more versatile telecommunication network systems between an optical distribution network and a plurality of customer premises. Thus component parts such as interfaces and modules for connecting customer premises to the optical fiber network may be handled more flexibly, with less bulky component parts and fewer handling steps for disconnecting and/or connecting individual customer premises, when any kind of installation work or deinstallation work has to be executed at a distribution point.

The present application thus provides an optical-electrical interface device which, although being a multi-port interface device, combines the benefits of conventional single-port interface devices and conventional multi-port interface devices with one another. Beyond that, the interface device proposed here is less spacious, easier to handle, particularly in confined access locations of an optical fiber network, and even consumes less power than conventional multi-port interface devices.

The electrical module devices, in particular the converter modules proposed in the application, are individually coupleable to the electrical ports of the optical-electrical interface device. The converter devices for the subscribed electrical conversion technology may be installed more easily according to each subscriber's choice and independently from the number of further customer premises connected to the same distribution point of the fiber network. Furthermore, different technologies of electrical conversion protocols, be it ADSL, VDSL, VDSL2, G.fast or a cable modem technologies, be it based on copper line pairs, multi-line bundles or bound to coaxial cables, or be it wireless, may combinedly coupled to one and the same access location of the optical distribution network more easily. With the interface device, the module devices and the interface system constituted by both of them, installment works become less effortsome, reduce the total power consumption for coupling an optical fiber to plural customer premises and allow more versatile combinations of different conversion technologies unachievable by conventional optical-electrical interface devices and deployment schemes.

FIG. 1 shows a cross-sectional, schematic view of an embodiment of an optical-electrical interface device OEID; 10 which is connectable to an endpiece of an optical fiber 101 accessible at a distribution point or any kind of access location of an optical distribution network, i.e. optical fiber network. The location where the fiber is accessible may, for instance, be a street cabinet, a handhole or a manhole, either aboveground or underground, be it in an urban or in a rural area, where customer premises to be provided with services of an optical distribution network are resident.

The interface device 10 comprises a housing 11 with an optical fiber port 12, which may be a hardened fiber optic connector HFOC (see FIG. 2) for safe optical connection even in the presence of dust, water, and/or moisture, especially when installed at buried distribution points located underground. The interface device 10 further comprises an optical network terminal unit ONT; 13 and a power sourcing management unit PSMU; 15 for managing the power supply of the ONT 13. Subsequently, sometimes the abbreviations for the component parts of the interface device will be used for the sake of brevity. The ONT 13 receives electrical power via at least some of the conductor lines 14 provided between the PSMU 15 and the ONT 13. The optical-electrical interface device 10 of FIG. 1 is a multi-port interface device, since it comprises a plurality of (for instance 2, 4, 8 or 16) electrical ports 19.

Conventional multi-port interface devices also comprise plural electrical ports. However, the electrical ports accessible outside the housing of conventional interface devices are only usable for receiving, from the subscriber premises, and/or outputting, towards the subscriber premises, telecommunication signals under a converted data format, i.e. an electrically modulated protocol (such as ADSL, VDSL, VDSL2, G.fast or cable modem or wireless protocol, for instance), since they are coupled to respective converter modules arranged inside the housing. According to FIG. 1, however, the electrical cables 18 directly connect the exterior electrical ports 19 to the power sourcing management unit with no protocol-based signal modulator or converter module connected between them. Accordingly, the electrical signals accessible outside the housing 11 at the electrical ports 19 are signals of the same data format as used inside the power sourcing management unit, for instance signals based on an Ethernet protocol. Accordingly, the electrical cables 18 and the electrical ports 19 may be Ethernet cables and Ethernet ports, for example, the Ethernet cables 18 comprising one, two, three or four pairs of twisted copper lines, one respective pair being schematically indicated in FIG. 1 at each electrical port 19. Preferably, two respective pairs of respective two twisted conductor and/or copper lines are comprised in each Ethernet electrical cable 18 connected to a respective port 19. As shown in FIG. 1, at least two electrical cables 18 and ports 19 are provided, thus qualifying the interface device as a multi-port device. However, further optional electrical cables and ports 18, 19 may be provided. FIG. 1 shows further, exclusively internal conductor lines 14 which also may be Ethernet conductor lines; inside the housing 11 they transmit telecommunication and other signals under the Ethernet protocol and supply electrical power to the ONT 13.

As shown in FIG. 1, the electrical cables 18 are passing through the housing 11 of the interface device 10, thus reaching from inside the housing to outside the housing. Accordingly, each electrical port 19 is movably connected, particularly flexibly or bendably connected to the housing 11, due to the bendable electrical cables 18 passing through cable passages holes 9 of the housing 11. The electrical ports 19 may, for example, be hardened electrical connectors HEC, as commonly used for underground distribution points in which permanent exposure to moisture or even water and/or dust exists. Thus, these electrical ports 19 and any further ones denoted by 'HEC' and/or optical connectors denoted by 'HFOC' as shown in FIGS. 2 and 5 to 11 may likewise be designed dust-proof and waterproof, as certified according to the international protection class 'IP68'. Likewise, the housing 11 per se may be constructed such that no open cable passage holes 9, as shown in FIG. 1 for the purpose of demonstration, occurs in an interface device if destined for an underground environment.

The interface device 10 of FIG. 1 is smaller, less bulky than conventional multi-port interface devices and is usable for a system in which the operation of electrically modulating and/or demodulating, that is converting signals transmitted via the electrical cables 18, is 'outsourced' from the interior of the housing 11 of the interface device 10, to outside the housing 11 of the interface device 10. Moreover, separate external converter modules (FIGS. 4 to 7 and 9) can now be coupled, in particular plugged, to the electrical ports 19 of the optical-electrical interface device 10 of FIG. 1. The electrical ports 19 may be so-called 'pigtails' with two respective pairs of twisted copper lines inside. As stated, in FIG. 1 only one single pair of copper line is shown for each electrical cable 18 for clarity. However, each electrical cable 18 may be a 4-lane cable, for instance an Ethernet cable. Likewise, each of the internal conductor lines 14 inside the housing may be a respective Ethernet cable with a plurality of lanes, such as 2, 4, or 8 lanes associated with the lanes of the respective electrical cable 18 at the other side of the PSMU 15.

The interface device of FIG. 1 allows a more versatile combination of different electrical conversion techniques, independently from the number of further subscribers connected to it and independently from the conversion technologies the other connected subscribers or end users have chosen.

Figure 2:
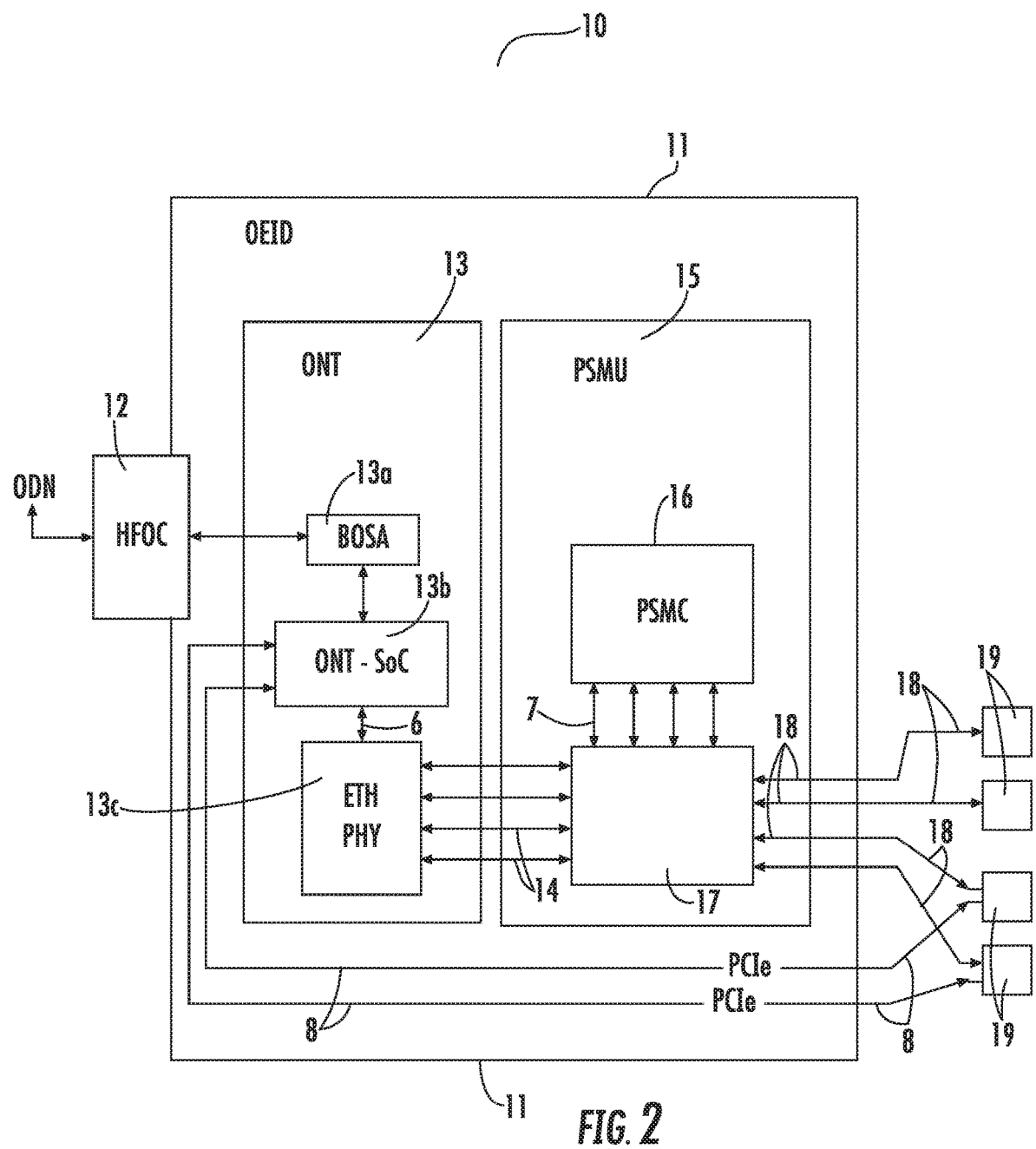
FIG. 2 schematically shows an exemplary implementation of the interface device of FIG. 1.

FIG. 2 schematically shows an exemplary implementation of the optical-electrical interface device OEID; 10 of FIG. 1. In FIG. 2, the OEID 10 comprises four electrical ports 19 for coupling four customer premises or other devices and the optical fiber of an optical distribution network ODN. The OEID 10 is coupleable to the optical fiber 101 by means of the optical fiber port 12, such as a hardened fiber optical connector HFOC. Again, both the optical and electrical plugs 12; 19 may be 'hardened' ones according to the protection class IP68, although this is optional. According to FIG. 2, the OEID 10 comprises a plurality of four electrical cables 18, rather than only two of them as depicted in FIG. 1. Further elements inside the housing and inside its component parts 13 and 15 are shown in addition in greater detail. According to FIG. 2, the ONT 13 comprises a bi-directional optical sub-assembly BOSA; 13a and an optical network termination system on chip ONT-SoC; 13b. The ONT-SoC or 13b includes, integrated on one chip, electronic components for driving and controlling the BOSA 13a, specifically according to the used PON-technology (such as an EPON, GPON or XGPON, for instance), as well as any Media Access Control functionalities. The ONT 13 further includes a physical transceiver chip 13c, such as an Ethernet physical transceiver chip ETH PHY. The ONT 13 and its elements may be constructed in conventional manner.

The BOSA 13a allows for bi-directional optical transmission to and from the optical fiber and comprises light-emitting as well as light-receiving elements, such as LEDs, laser diodes or photo diodes, for instance. The physical transceiver ship 13c; ETH PHY comprises Ethernet ports for coupling a plurality of customer premises, via the plural conductor lines 14, to the ONT-SoC 13b.

According to FIG. 2, four electrical ports 19 are connected, via the electrical cables 18, to the PSMU 15 which in turn is connected via the conductor lines 14 to the ONT 13. Inside the PSMU 15, there is provided a power share controller or, more generally, a power sourcing management controller PSMC 16, as well as a power sourcing interface 17. The power sourcing interface 17 is interconnected between the electrical cables 18 and the further conductor lines 14 and is further connected to the PSMC 16 via conductor lines 7.

Figure 3:
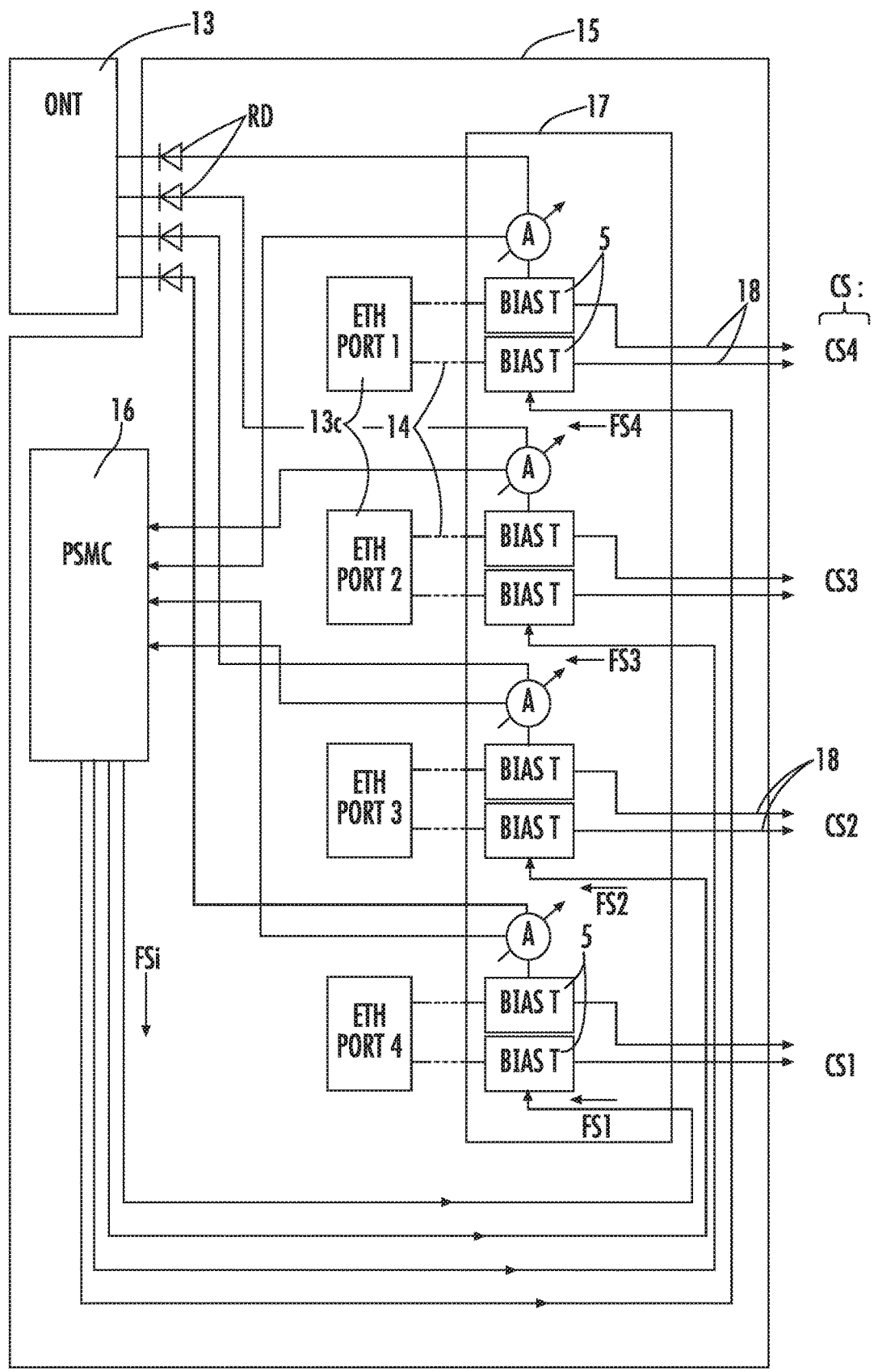
FIG. 3 schematically shows an exemplary implementation of a power sourcing interface comprised in a power sourcing management unit of the interface device of FIG. 2.

An exemplary embodiment of the power sourcing management unit 15, particularly regarding the construction of the power sourcing interface 17, is shown in FIG. 3. The embodiments of FIGS. 2 and/or 3 are based on Ethernet and, in particular, on Power-over-Ethernet adopted here for supplying electrical power to the ONT 13. Each electrical cable 18 connected to a respective plug 19 (pigtail for Ethernet) comprises at least two pairs of conductor lines or lanes for communication between a customer premise (via the power sourcing interface 17 of the PSMU 15) and the ONT 13. Inside the power sourcing interface 17, a respective pair of bias T's, i.e. of direct current extractor units 5 for extracting a direct current from any high-frequency signals, is provided.

In the attached modules (FIGS. 4 and 5) a bias voltage is converted to a low voltage which is biased, i.e. added or superposed to the high frequency signal and then delivered to the PSMU via one pair of the copper cables. In the reverse direction, the respective feedback signal FSi generated by the PSMC 16 is biased to the high frequency signal coming from the OEID 10 and controls the DC/DC converter 25 in the attached electrical module device 10 to deliver a bias voltage that results in equal current shares of all subscribers in the PSMU 15. Such control signals CSi are transmitted to all connected electrical module devices 20.

The power consumption is measured and integrated over time, by means of an amperemeter, so as to communicate the share of power supply of the respective customer premise or end user, who is connected to the associated electrical port 19, to the power sourcing management controller 16 via the feedback lines 7. Thereby, the integrated feedback signals FSi, integrated over time for each customer premise separately, are communicated to the attached module devices 20 via one of the electrical cables 18 (copper pairs or pigtails). The PSMC 16 calculates and/or controls the share of electrical power which each connected customer premise has to provide. In case of four customer premises connected to the interface device 10, each customer, for instance, is controlled to provide a target share of 25% of the power consumption of the ONT 13. The PSMU 15 transmits direct current feedback signals FSi, which are low voltage control signals CSi; CS1; . . . , CS4 of about 5 Volts, for instance, via some of the lines/lanes of the optical cables 18, towards the customer premises for ensuring that exactly these target bias voltages are delivered via the DC/DC converters of the attached modules. In case of any deviation from the default target shares, the direct current voltage bias of individual control signals CSi is raised or lowered, thereby increasing or decreasing the power supply share of the respective customer premise. The control signals CSi are direct current bias voltages on other lines/lanes of the Ethernet cables 18 than those lines/lanes used for reverse-feeding the direct current power source generated by the DC/DC converters 25 in the attached module devices 20. The control signals CSi are also in the range between 2V and 5V. The control signals CSi are transmitted to the attached module devices 20, the exact numerical value of the bias voltage being controlled and adjusted by the PSMC 16. This ensures that each customer premise supplies the correct amount or share of electrical power to the commonly used ONT 13.

Apart from the elements of the PSMU 15 shown in FIG. 3, the bias T's, i.e. direct current extractor units 5 transmit the high frequency Ethernet signals by means of the conductor lines 14 to the associated electrical ports of the Ethernet physical transceiver chip 'ETH PHY'; 13c of the ONT 13. The dotted lines 14 in FIG. 3 indicate that these conductor lines, as well as the respective ports of the physical transceiver chip ETH PHY' or 13c, are not comprised in the power sourcing management unit 15, although being depicted inside it.

The direct current extractor units 5 (bias T's) split the direct current from the high-frequency data signals, and the rectifying diodes RD serve for electrical power summation. Based on the integrated current received from the four respective pigtail cables 18, the power sourcing management controller 16 controls the magnitude of the direct current feedback signals FSi; CSi which are applied to another, second pair of twisted copper lines of the respective pigtail cable 18, thereby controlling DC/DC converters in the attached modules.

Reverse power feeders installed in the customer premises generate a bias voltage V1 for reverse power feeding, such as a bias voltage of 58V, for example. In the DC/DC converters 25 of the electrical module devices 20 that are attached to the OEID 10, this voltage V1 is split from the high frequency signal and converted to a much lower supply voltage V2 (of between 3V and 5V, for example) which is then injected to the high frequency signal and transmitted towards the OEID 10 via one of the electrical ports 19 (pigtail copper pairs). In the power sourcing management controller PSMC; 16, the bias voltage, i.e. the reinjected supply voltage V2 is then split from the high frequency signal by the direct current extractor units 5, i.e. by respective upper bias-T's shown in FIG. 3. As further indicated in FIG. 3, the amperemeters A measure the current reverse-fed from each respective electrical module device 20, and the currents from all attached electrical module device 20 are combinedly reverse-fed, via rectifying diodes RD (FIG. 3), directly to the optical network terminal unit 13 for powering it.

The amperemeters connected to the power sourcing management controller PSMC; 16 communicate the current values measured. The PSMC 16 then generates feedback signals FSi, each of which is a direct current, low voltage control signal that is applied to the high frequency signal by means of direct current extractor units 5 (lower bias T's shown in FIG. 3) and then transmitted, via the other copper line pair, to the respective attached electrical module device 20 as a respective control signal CSi. Each direct current control signal CSi is split from the high frequency signal in the respective electrical module device 20 and controls the DC/DC converter 25 in that module device 20 to change the supply voltage, i.e. V2 for the OEID 10, to a voltage amount that results in an equal current share of all respective electrical module device 20 attached to the optical-electrical interface device 10.

Despite the two different abbreviations FSi and CSi, it is to be noted that both of them denote the same signal; thus the abbreviations FSi and CSi may be exchangeably used throughout the application. The abbreviation FSi is used to express the signal's function, internally inside the PSMU unit 15, as a feedback signal for supplying a feedback from the PSMC controller 16 where it is generated. The abbreviation CSi is used outside the PSMU unit 15 and outside the OEID 10 to express the signal's function of acting as a control signal for controlling the DC/DC-converters of the electrical module devices 20.

FIG. 2 shows further optional features which are not required for the proposed optical-electrical interface device 10 but which may easily be combined therewith. In particular, the interface device 10 may comprise further electrical cables 8 connected between the ONT SoC 13b of the ONT 13 and at least one or some of the electrical ports 19. By these further electrical cables 8 which bypass the PSMU 15, signals of a different electrical data transmission protocol than Ethernet, such a PCIe, i.e. 'Peripheral Component Interconnect express', may be transmitted. Finally, further conductor lines 6 provided between the components 13b, 13c of the ONT 13 are shown. In the interface device of FIGS. 1 to 3, the electrical cables 18 and the further conductor lines 14 and 7 are all provided for bi-directional signal transmission, as indicated by the arrows at either end thereof. Likewise, the further electrical cables 8 for PCIe are bi-directional. Any of these lines 6, 7, 8, 14, 18 may comprise a respective plurality of lines or lanes, as required for transmitting the respective high-frequency signals and/or direct current bias voltages in the respective directions. For simplicity, in FIG. 2 and most parts of FIG. 3, only one respective conductor line is shown for clarity.

As a further optional feature, in FIG. 2 some of the Ethernet cables 18 and PCIe cables 8 bypassing the power sourcing management unit 15 are connected to the same electrical port 19; these electrical ports may additionally transmit signals under the PCIe protocol. They may likewise be Ethernet cable ports compatible with power-over-Ethernet. However, these ports are hybrid ports combinedly used for Ethernet and PCIe, whereas the other ports are pure Ethernet ports. The hybrid ports allow to increase the number of customer premises coupleable to the interface device 10 above the number of Ethernet ports 19 comprised in it.

Since electrical conversion of high-frequency data is no longer executed in component parts of the interface device 10 but, instead, in converter modules and other module devices coupleable, particularly pluggable to the electrical ports 19 of the interface device, the interface device 10 is more versatile regarding the number of customer premises coupleable to the optical fiber network and regarding the respective electrical conversion technology; any customer may independently select his own electrical data conversion technology (such as VDSL, G.fast, cable modem technology, or wireless, etc.) with no limitations or constraints by the optical-electrical interface device. Furthermore, the interface device 10 is smaller and more compact, i.e. it can be accommodated in a small and/or jammed distribution point more easily. Furthermore, the power consumption of the interface device 10 is reduced even compared to conventional multi-port interfaces, since no spare converter modules comprised inside the housing need to be controlled, powered and/or operated while not reserved for a subscriber. Beyond that, upon migration of an individual customer to another technology of electrical conversion, the respective converter module can easily be separated from the electrical port 19 and replaced with another one without the need to at least temporarily disconnect the other subscribers from access to the optical distribution network.

Figure 4:
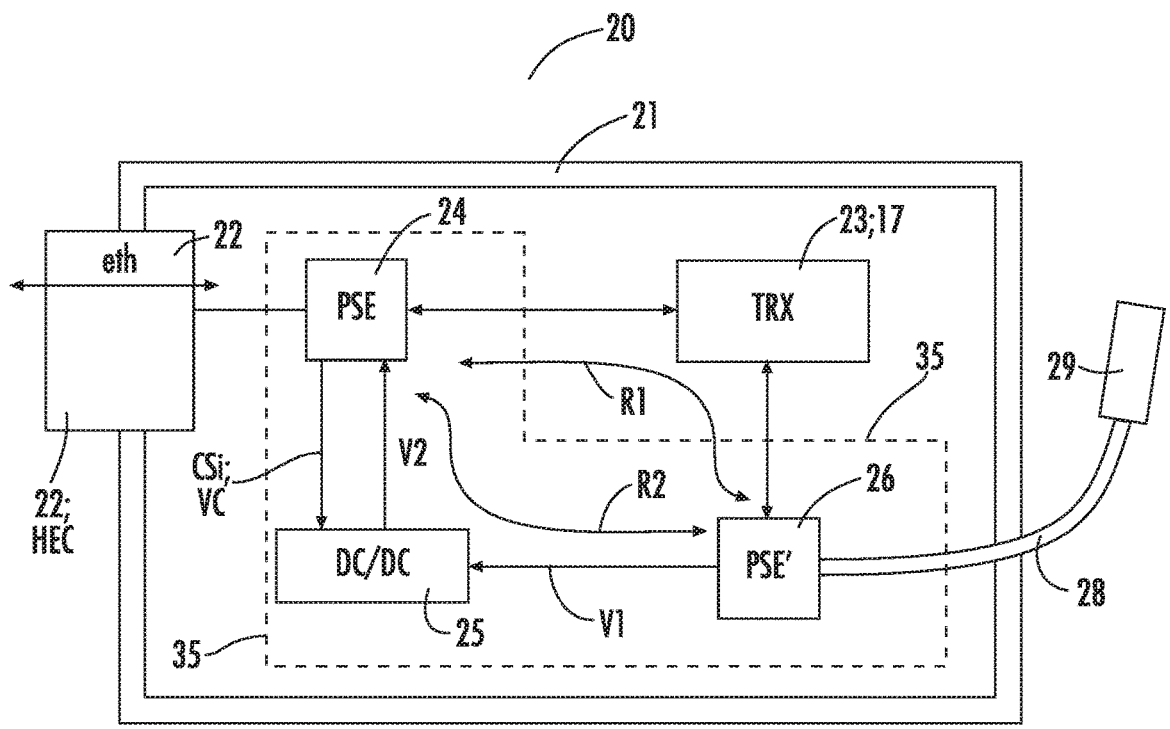
FIG. 4 shows a schematic cross-section of an electrical converter device coupleable to an electrical port of the interface device of FIG. 1 or 2.

FIG. 4 shows a schematic cross-sectional view of an exemplary embodiment of an electrical module device 20. A plurality of electrical module devices of FIG. 4 or the subsequent figures is coupleable to the plural electrical ports 19 of the optical-electrical interface device 10 described hereinabove. As shown in FIG. 4, the electrical module device 20 comprises a housing 21, a first electrical port 22 and a second electrical port 29. Although an electrical cable 28 partially outside the housing 21 is shown, between both electrical ports 22, 29, a first electrical route R1 may also extend completely inside the housing. Along the first route R1 between both electrical ports 22, 29, high-frequency data signals are bi-directionally transmissible. Along the first route R1, a transceiver 23, particularly an electrical converter 27, may optionally be provided. Anyway, the first route R1 is the default route for data transmission between the electrical ports 22, 29. Furthermore, a direct current bias voltage is suppliable, from the second 29 to the first electrical port 22, for powering another device, such as an optical-electrical interface device 10 as described hereinabove, for instance by Power-over-Ethernet with a DC bias voltage of 48 V or, more generally, between 37 V and 59 V.

According to the application, the module device of FIG. 4 further comprises a power feeding adjustment unit 35 configured to adjust an amount, rate or share of electrical power and/or or a level of a direct current bias voltage V2 to be supplied to the first electrical port 22, responsive to a control signal to be received via the first port 22. In particular, one of the control signals CSi of FIG. 3 may be received at the first port 22, when plugged to the port 19 of the interface device 10 of FIGS. 1 to 3. The corresponding control signal CSi, for instance, is a control bias voltage of about 5 V, the exact voltage level being controlled by the power sourcing management controller 15 of the interface device 10. Dependent on the level VC of this control voltage CSi, the power feeding adjustment unit 35 transforms the received first bias voltage V1 into a second, adjusted bias voltage V2 which is supplied to the interface device 10 via the ports 19 and 22 of both devices plugged together.

As regards the internal construction of the power feeding adjustment unit 35, it may comprise a first power sourcing interface unit 24 or PSE, a second power sourcing interface unit 26 or PSE' and a DC/DC converter 25 connected between them, thus constituting a second route R2 along which direct current signals, that is bias voltages, are extracted and thus locally de-routed and separated from the first route R1 where the high-frequency data signals will pass. Thus, the power sourcing interface units 24, 26 act as a low pass filter for separating the bias voltages. Responsive to the level VC of the control signal Csi which is the control voltage VC, the level of the second bias voltage V2 reverse-fed to the interface device 10 is adjusted in accordance with the share of electrical power to be supplied by the respective electrical module device 20i.

Figure 5:
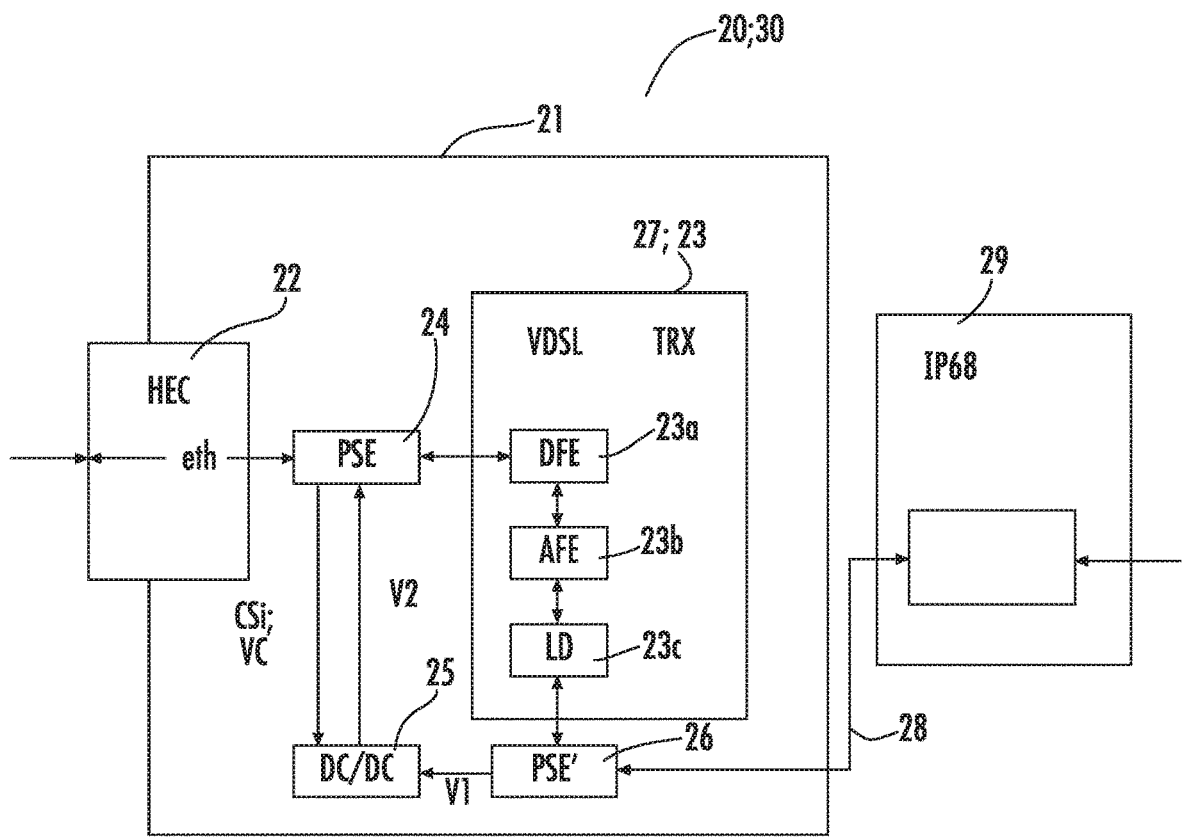
FIG. 5 schematically shows an implementation of the converter device of FIG. 4.
Figure 6:
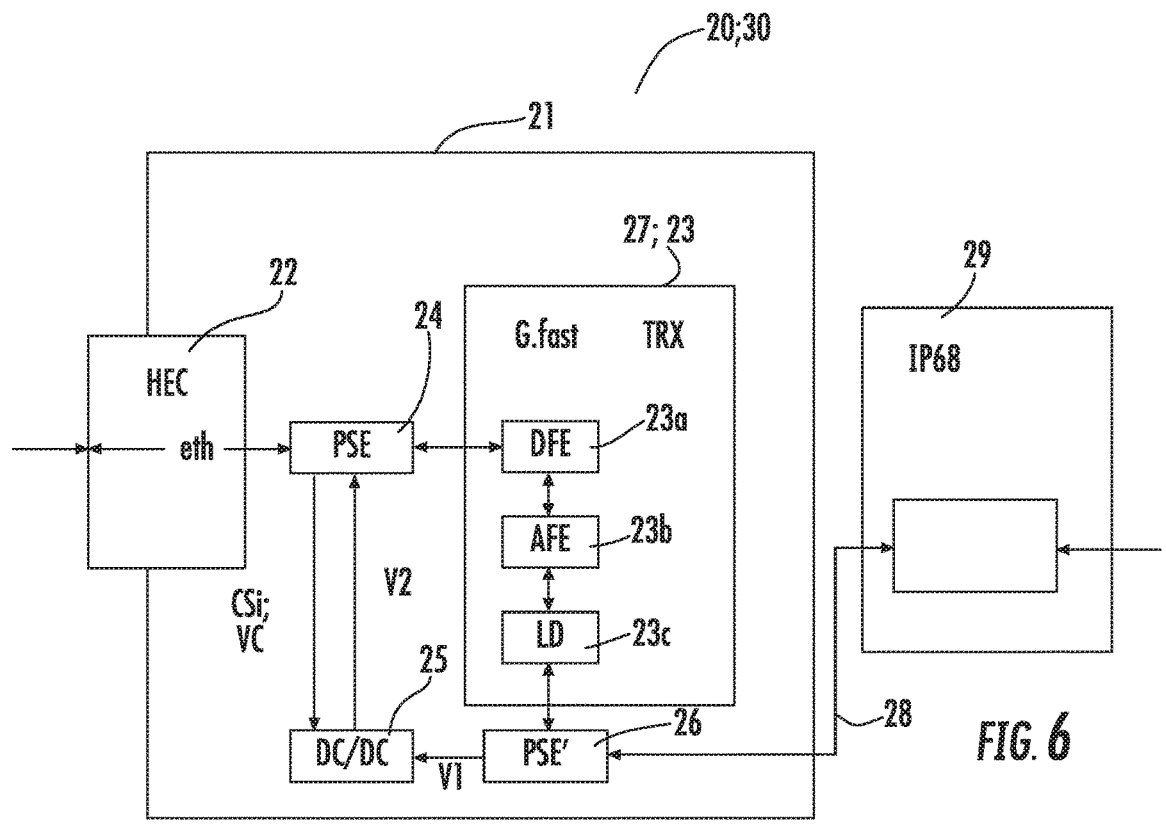
FIG. 6 schematically shows another implementation of the converter device of FIG. 4.
Figure 7:
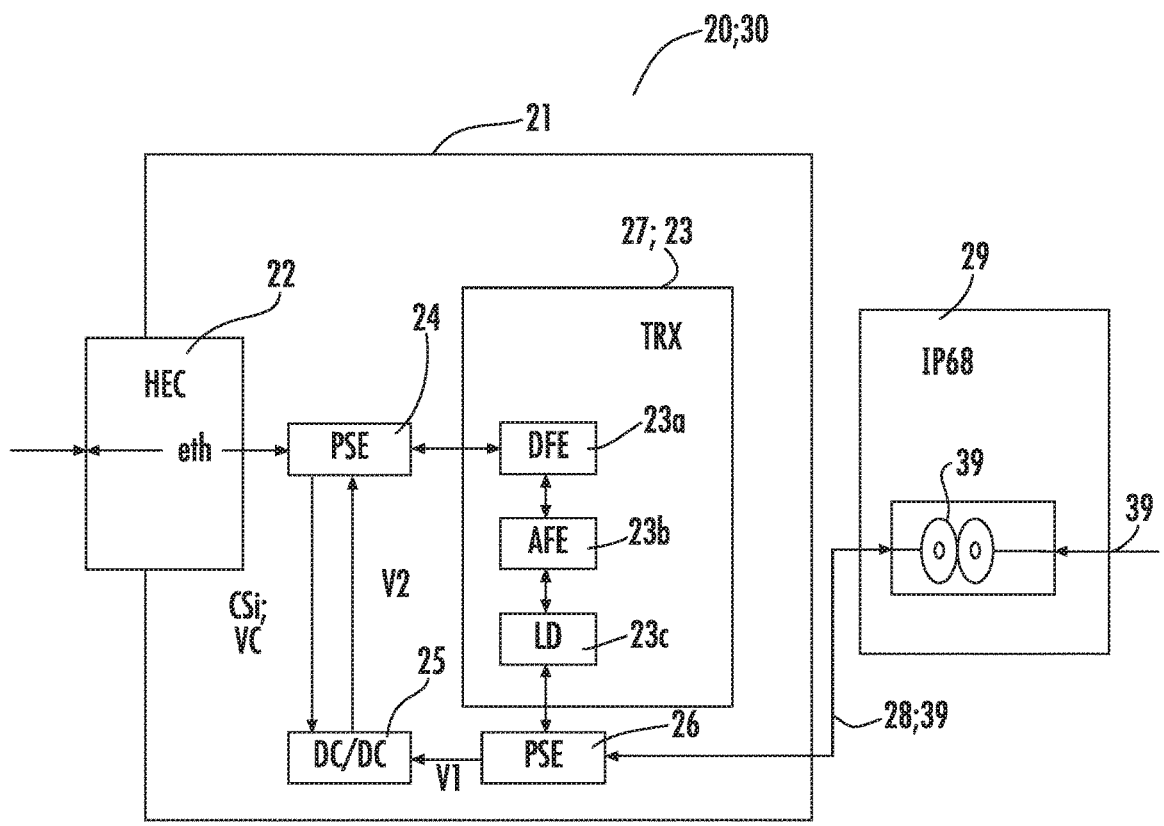
FIG. 7 schematically shows another implementation of the converter device of FIG. 4.

Whereas in FIG. 4, the electrical transceiver 23 or converter 27 is optional, FIGS. 5 to 7 show exemplary implementations of the electrical module device of FIG. 4 in which different kinds of transceivers, particularly of electrical converters 27, are provided. Since the internal construction is very similar to FIG. 4, only the further details not yet described with reference to FIG. 4 are now described with reference to FIGS. 5 to 7. There, the electrical module devices 20 are electrical converter modules 30 for electrically converting, by modulating and/or demodulating, electrical signals between two different data protocols. According to FIG. 5, the transceiver 23, i.e. converter 27 is one that is operating according to VDSL or, more commonly, one of ADSL, VDSL, or VDSL2. Thus, VDSL signals are transmitted between the transceiver 23, i.e. converter 27, and the second electrical port 29, whereas between a transceiver 23 and the first electrical port 22, the data are transmitted under another data protocol, i.e. Ethernet.

Like the interface device 10 described above with reference to FIGS. 1 to 3, also the module device 20, i.e. the converter module 30, may be constructed to be used at a distribution point or other kind of access location of an optical distribution network, such as a street cabinet, a manhole or a handhole provided over ground or underground. Particularly for underground installations, the module device 20 may be designed dust-proof and waterproof, as indicated by the International Protection class symbol 'IP68' in FIG. 5. Inside the second electrical port 29, an electrical splice, i.e. connection with a second pigtail or port, to the pigtail of the electrical cable 28 may be provided and closely protected against exposure to dust, moisture and/or water. Optionally, the second port 29 may be closely connected to the housing 21, with no section of an electrical cable 28 being accessible or exposed in-between. The first and/or second electrical connectors 22, 29 may be hardened electrical connectors HEC.

The electrical converter 27, i.e. transceiver 23, may comprise a digital frontend unit 23a; DFE and an analog frontend unit 23b; AFE as well as a line driver 23c; LD which all may be designed in a conventional manner, the more so as they are arranged along the first route R1.

FIG. 6 shows another embodiment in which the module device 20 of FIG. 4 is implemented as G.fast-converter, rather than as a VDSL converter as shown in FIG. 5. The G-fast protocol may be used for telecommunication copper lines of short distances below 250 m, that is particularly for FTTdp and FTTB (fiber to the distribution point, or to the basement). However, most of the constructional details are unaffected by the particular kind of converter 27, i.e. transceiver 23. Accordingly, the above explanations regarding FIGS. 4 and 5 equally apply to FIG. 6. The same holds for FIG. 7 which shows another module device 20 implemented as a cable modem converter device instead. Accordingly, the converter 27 or transceiver 23 is configured for transmission of cable signals for coaxial cables to and from the second electrical port 29, as indicated schematically by the coaxial cable cross-section 39 inside and at both sides of the second port 29 in FIG. 7.

Figure 8:
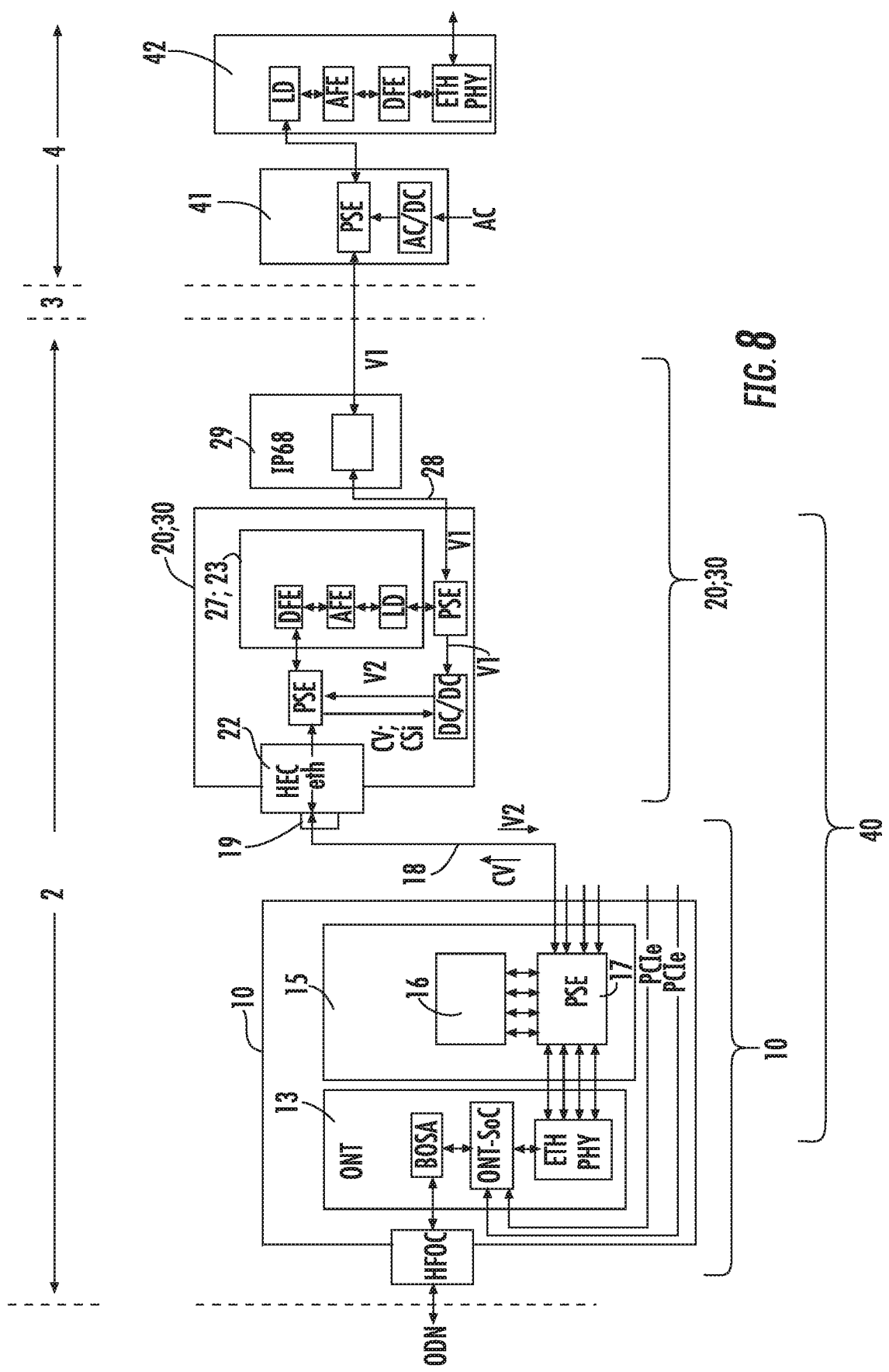
FIG. 8 shows an interface system for connecting at least one customer premise to an optical distribution network.

FIG. 8 shows a novel deployment scheme proposed according to the application for bridging the distance between an optical distribution network 1; ODN and a customer premise 4. At a distribution point or another kind of access location 2 where plural optical fibers are accessible, the optical-electrical interface device 10 such as that of FIGS. 1 to 3 is connected to an endpiece of one of the optical fibers. At the electrical port 19 of the interface device 10, an electrical module device 20, such as an electrical converter module 30, is coupled via its first electrical port 22. To the second electrical port 29, further electric cables for bridging the lead-in area 3 may be connected, thus bridging the remaining distance to the subscriber premise 4, such as a house or apartment, a basement or another end user's residence, area or device. For instance, a modem, a cell phone or a device for radio, telecommunication or other wired and/or wireless broadband communication services, including WiFi and others, may be connected. At the subscriber premise 4, a customer premise modem 42 as well as a reverse power feeder 41 are installed, the power feeder 41 receiving alternating current which is internally converted, by an AC/DC converter, into a direct current of about 48 V, as is the case for Power-over-Ethernet. This is the direct current bias voltage V1 supplied, through the lead-in area 3 and the module device 20, before it is converted to the DC bias voltage V2 of a lower, controllable voltage level for reverse-feeding and thus powering the optical network terminal unit 13 of the interface device 10.

The power sourcing management unit 15, particularly its power sourcing management controller PSMC; 16 includes a power share controller for controlling the power share reverse-fed from any customer or subscriber premise connected to the interface device 10. Thus the PSMC 16 determines, by means of the control signal CSi corresponding to the control voltage CV, the level of the adjusted bias voltage V2 generated inside the module device 20 by means of a DC/DC controller of the power feeding adjustment unit 35 (FIGS. 4 to 7). For instance, when the first voltage V1 supplied by the reverse power feeder is about 48 V, the control voltage CV controls the level of the second voltage V2 to be adjusted somewhere around 5 V. This adjusted direct current bias voltage V2 is then supplied to the ONT 13 for operating it.

Whereas FIG. 8 shows only one module device 20 connected to the interface device 10, in reality a plurality of module devices 20, with or without converters inside, is connectable to some or all of the electric ports 19, of which only one is depicted in FIG. 8. Accordingly, the interface device 10 and a plurality of module devices 20 constitute a system 40 not only for managing the data transfer between the optical distribution network 1 and the plurality of customer premises 4, but also for controlling the shares of electrical power supplied by each connected customer premise. The particular kind of module device 20, such as the protocol technology of its transceiver or electrical converter 23; 27 may be chosen by each customer or subscriber individually and independently from those chosen by the other subscribers, without any technical constraints arising due to the novel construction of the interface device 10 which is configured to be operated independently from the kind of electrical converter module chosen by the customer premises 4 connected to it. Conventionally, the different converter protocols of two subscribers require another multi-port or single-port optical-electrical interface device to be installed in addition. The power sourcing management system 40 shown in FIG. 8, however, is more versatile than any single-port or multi-port optical-electrical interface device known so far. In FIG. 8, the modems 27 and 42 provided for modulating and demodulating, that is converting electrical signals for bridging the lead-in-area distance between them, may, for instance, be cable modems for coaxial cables, for VDSL modems, G.fast modems or others modems for wired or wireless communication.

FIG. 9 shows another embodiment of an electric module device 20; 20' which does not comprise an electric converter. Instead, the module device 20; 20' is designed for connecting two further (module) devices to be plugged to its second electrical ports 29, 29' to the interface device 10. For instance, one of the further devices may be connected to the interface device 10 by means of the module device 20' of FIG. 9, via Ethernet cable, whereas the other one may be connected via a PCIe cable, for instance.

According to a first aspect of this embodiment, a module device 20 is configured for connecting two (module) devices to one single electric port of the interface device 10, with one of the further devices (to be coupled to the ports 29; 29') comprising its own electrical converter. Thus, the module device 20' serves for transmission of signals without conversion.

According to a second aspect of the embodiment of FIG. 9, the module device 20' is configured for reverse-feeding electrical power and/or bias voltage V1 from another device than that device connected to its second electrical port 29. For instance, electrical power may be drained and reverse-fed from a power pole or another kind of local power feed device 48, or a customer premise reverse power feeder 41n by which power and/or a bias voltage V1 is reverse-fed. In the module device 20', the power feeding adjustment unit 35 generates the bias voltage V2 supplied to the interface device 10, the level of which is controlled by the level of a control voltage CVi received from the interface device 10 via the electrical ports 19 and 22 plugged together.

Both aspects of the embodiment of FIG. 9 may also be realized combinedly. In this case, reverse power feeding of the adjustment unit 35 may be managed so as to control and adjust the amount of electrical power supplied by all subscribers or customer premises connected to the electrical ports 29, 29' of the module device 20' combinedly. As a third aspect, realizable either alone or combined therewith, the module device 20' may be used for using an electrical port 19 of the interface device 10 for transmitting electrical signals of two different protocols simultaneously, such as Ethernet and PCIe, for instance.

Figure 10A:
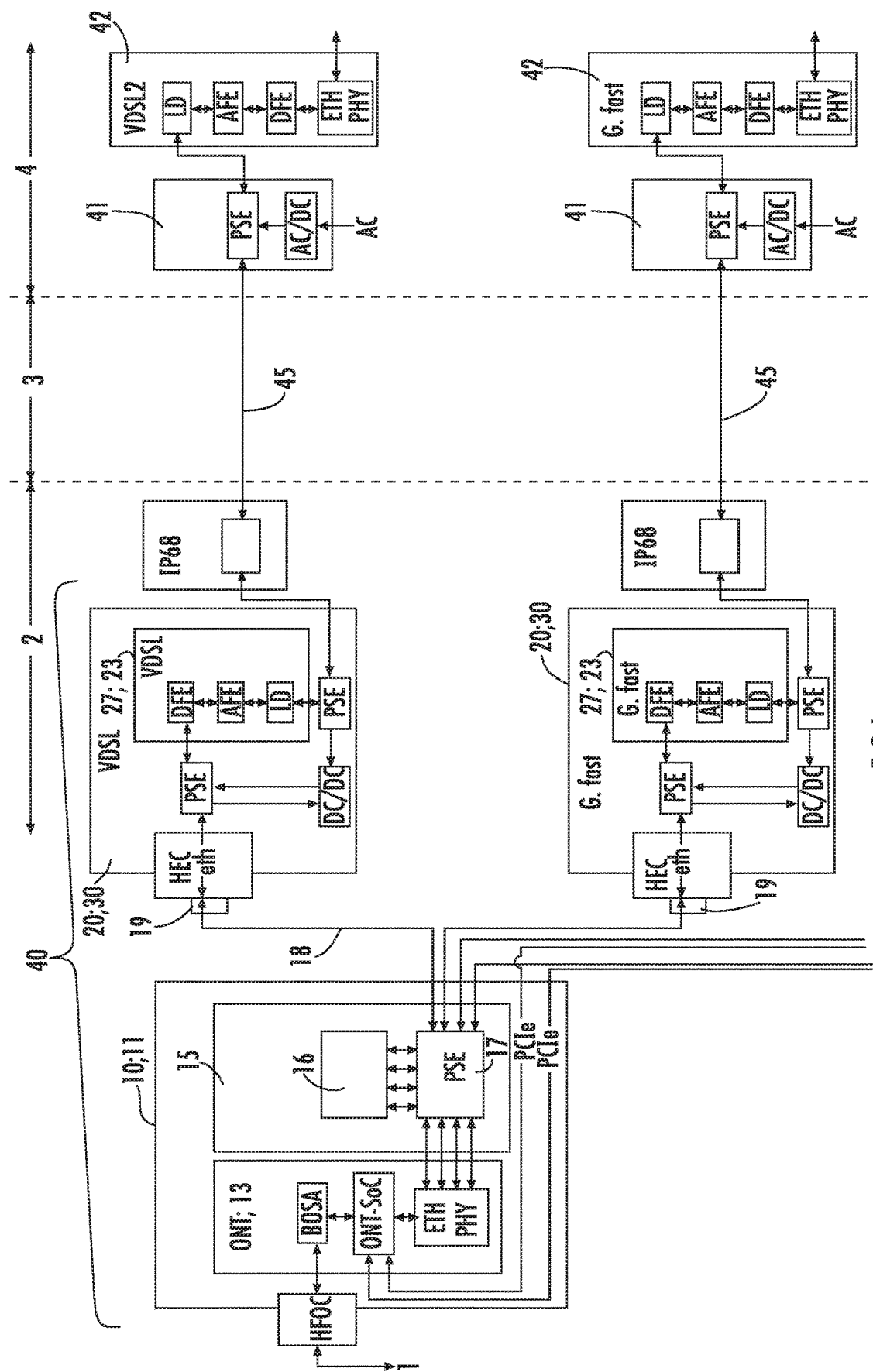
FIG. 10A shows an exemplary embodiment of an interface system which comprises the two converter modules of FIGS. 5 and 6 connected to the interface device of FIG. 2.

FIG. 10A shows a deployment scheme of an interface system 40 comprising two module devices 20 or converter modules 30 and the interface device 10 to which they are plugged or otherwise mounted. For instance, in the case of two subscribers subscribed to telecommunication services using different kinds of converter modules, such as VDSL and G.fast, respective compatible converter modules 30 may be coupled to respective ports 19 of the interface device 10. Thus, different types and modem protocols may be combined at the same optical-electrical interface device 10. There are no spare converter modules inside the interface device 10 which would reduce the options of choosing a particular converter technology or which would constantly drain power even when not connected to a customer subscribed to it. The embodiment of the communication and power reverse feeding system 40 shown in FIG. 10A is only exemplary. Particularly, any kind and combination of module devices 20 or converter modules 30 and is couplable to the electrical ports 19 of the optical-electrical interface device 10.

Figure 10B:
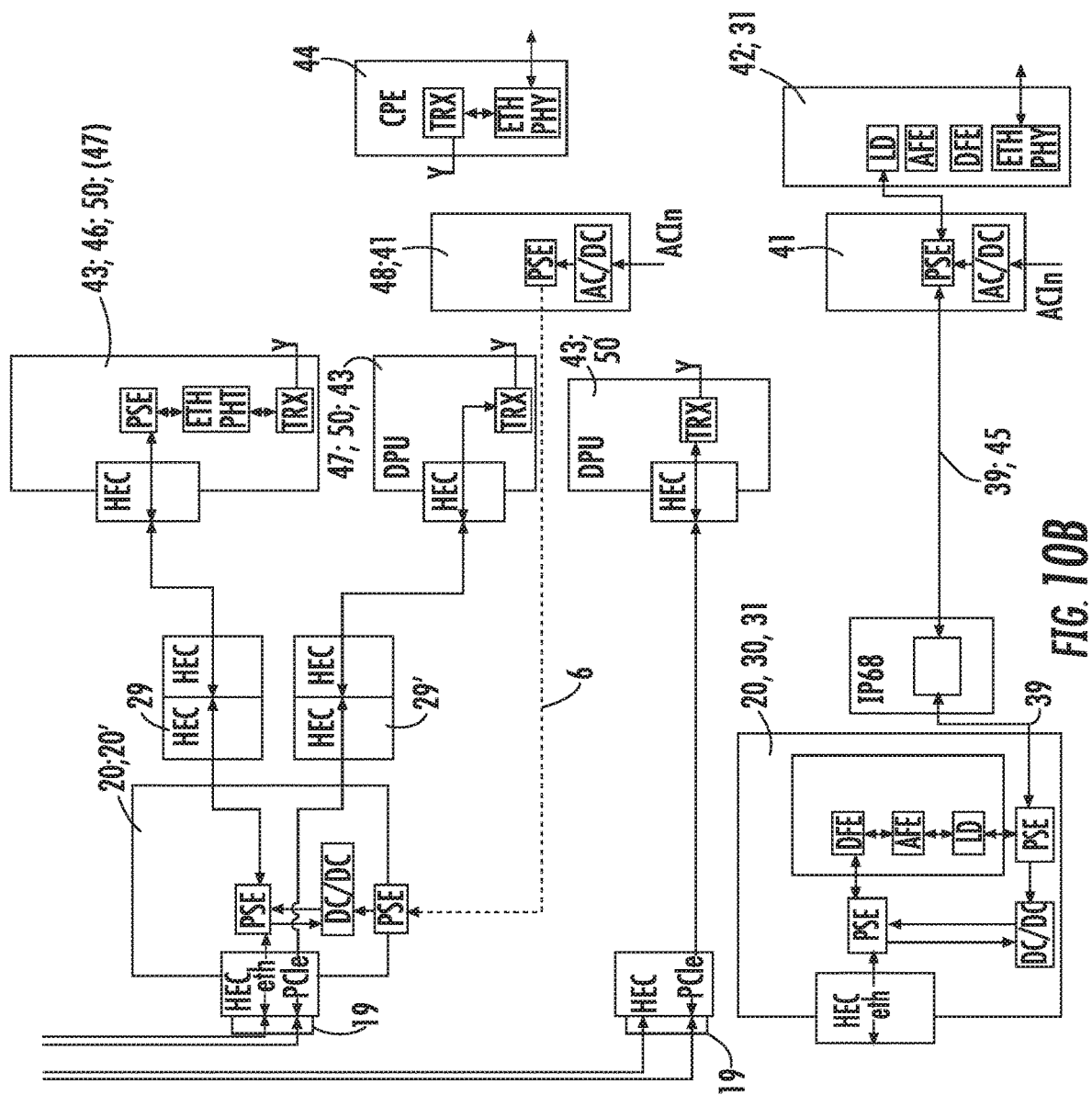
FIG. 10B shows further interface system components which may be connected to the interface system of FIG. 10A, FIG. 10B showing further modular devices and converter modules pluggable to the electrical ports of the interface device shown in FIG. 10A.

FIG. 10B shows another deployment scheme of further module devices 20 coupleable to the interface device 10, depending on the respective customer premise equipment or data processing units DPU; 43, which may for instance be cell radio access nodes 46 or other devices located either in a lead-area 3 at customer premises. In FIG. 10B, the module devices 20; 20'; 30 may be coupled to the electrical ports 19 of an interface device 10 (not illustrated in FIG. 10B but in FIG. 10A).

The systems of FIGS. 10A and 10B may also be taken in combination with one another, thus showing two complementary parts of a combined, enlarged interface system 40 comprising one interface device 10a and a plurality of, for instance four, module devices 20 plugged to the ports 19 of the interface device 10. The module device 20' represents a module device as shown in FIG. 9; it is a breakout module by which the Ethernet and PCIe cables combined in the same pigtail or port 19 of the interface device 10 are separated and connected to different further module devices, data processing units and/or customer premise equipment devices. Accordingly, the module device 20' comprises two short pigtails, each carrying a respective electrical port 29; 29'.

According to the deployment scheme in FIGS. 10A and 10B, various kinds of module devices 20 are coupleable to the interface device 10, and a large variety of customer premise equipment or other kinds of devices, such as data processing units, wireless devices, data processing units, power source devices or the like are coupleable, via a respective one of the module devices 20, to the interface device 10.

Figure 11:
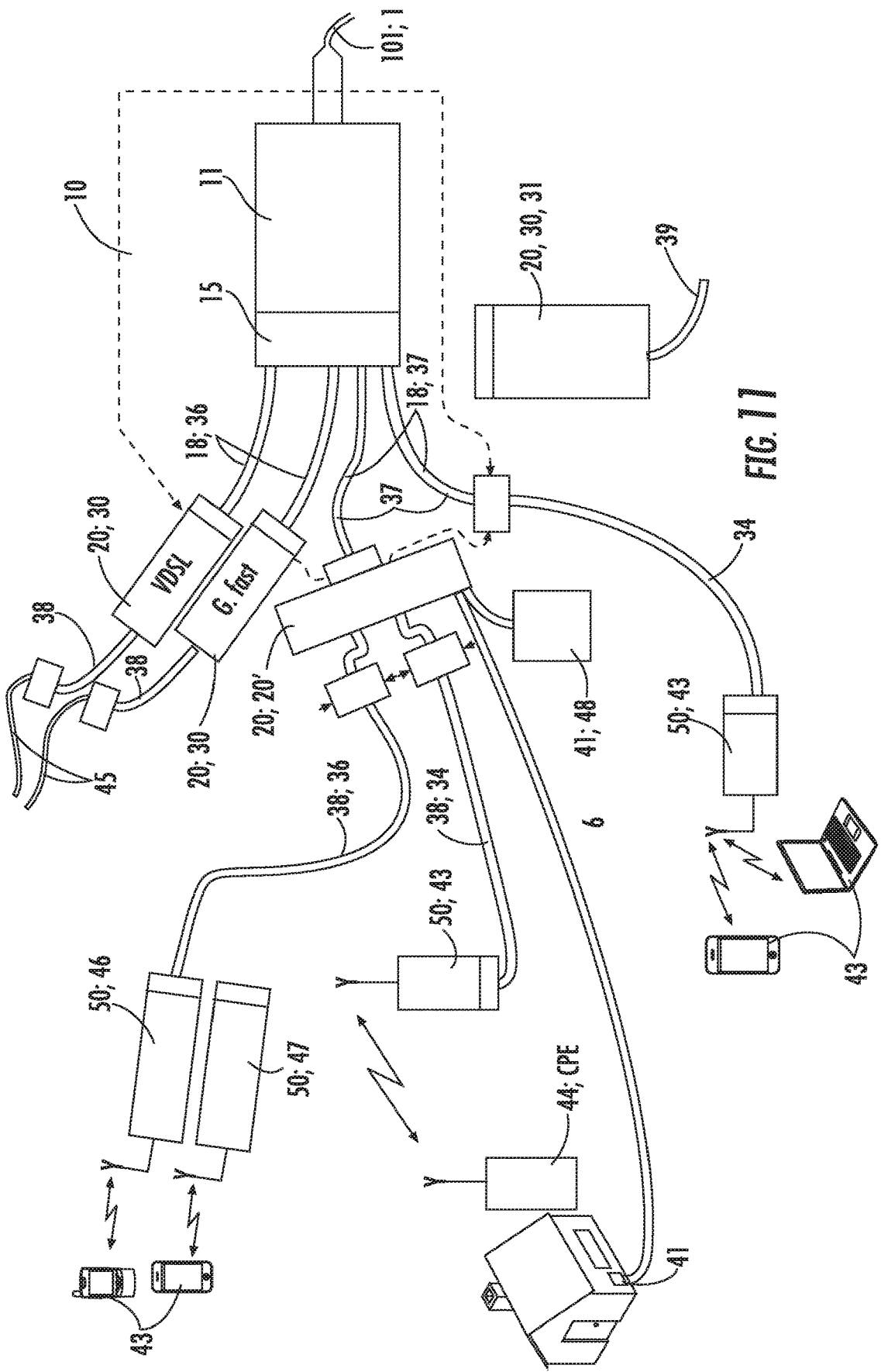
FIG. 11 shows a schematic view of another system for connecting various customer premise equipment and/or power sources devices to an optical fiber endpiece at an access location of an optical distribution network.

The system of FIGS. 10A and 10B is further shown in FIG. 11 representing a more intuitive representation from the customer perspective. Among the plural customer premise equipment devices, data processing units, power source devices or other kinds of end user or communication devices plugged to the electric ports 19 of the interface device 10, there are two converter module devices 20; 30 for VDSL and G.fast; they are connected to those electrical cables 18 of the interface device 10 being pure Ethernet cables 36. In addition, a wireless module 50 for wireless communication (via cell phone, smartphone, laptop or the like) is connected, via a PCIe cable 34, to one of the cables 18 being a hybrid, that is combined Ethernet and PCIe cable 37. Furthermore, to the other hybrid Ethernet and PCIe cable 18 of the interface device 10, a hybrid module device 20' is plugged which enables coupling of more than one customer premise devices to one and the same cable 18 or port 19.

The module device 20' may receive electrical power from a local power feed device 48, such as a power pole, or, alternatively, from a reverse power feeder 41 installed at a customer premise and connected by a pure reverse power feed line 6 which is not used for transmission of communication data. The module device 20' can be used for coupling for instance two devices to the interface device 10. According to FIGS. 10A to 11, a first wireless module 50, such as a small cell radio access node 46 (or, alternatively, an Ethernet bridge WiFi module) may for instance be connected to a first port of the module device 20', and another wireless module 50, such as a data processing unit 43, may be coupled to another port of the module device 20'. Diverse kinds of user devices may be wirelessly coupled to the wireless modules 50, for example cell phones, mobile phones, smartphones, computers, laptops or any other kind of customer premise equipment installed at home or being portable. In particular, a wireless module can be connected to the optical-electrical interface device 10 via an Ethernet connection, i.e. via the Ethernet port of the data processing unit 43; 46; 50; 47 of FIG. 10B, rather than via a PCIe-connection as it may normally the case for WiFi modules or other wireless modules. Once the hybrid Ethernet and PCIe module 20' is connected to the hybrid pigtail, i.e. combined Ethernet and PCIe cable 37, it thus serves as an Ethernet-PCIe-breakout module for coupling a first device—via Ethernet—and a second device—via PCIe—to the interface device 10.

The particular combination of devices connected to the cables 18 of the interface device 10 in FIGS. 10A, 10B and 11 is only exemplary and may be varied. For instance, likewise, a cable modem 31 for communication via a coaxial cable 39 may also be connected to one of the cables 18, i.e. ports 19 of the interface device 10.

As shown in the customer premise area 4 of FIGS. 10A and 10B, the deployment scheme terminates at the respective customer premises where a modem 42 for the respective bridging technology (VDSL2, G.fast, or the like) as well as a reverse power feeder 41 are installed. An alternating current is fed to the reverse power feeder 41 and is transformed, by an AC/DC converter, to a direct current bias voltage V1. In the case of Power-over-Ethernet V1 may be between 43 V and 58 V, for instance 48 V. In the lead-in area 3 between the distribution point and the customer premises, the respective legacy copper wire infrastructure may be used for coupling the customer premise devices to the module devices 20 which in turn are coupled, via the interface device 10, to the optical distribution network. As the legacy copper infrastructure, for instance existing telecommunication lines and/or power supply lines, particularly twisted copper pair lines or coaxial cables 39, or even high-voltage power supply lines may be used and operated as combined communication and power feedback lines 45 for powering the optical-electrical interface device 10. A respective data converting technology for bridging the lead-in area may be chosen individually by the customers. Accordingly, any conventional protocol may be used as bridging technology, such as VDSL, G.fast, cable modem technology or any other wired or wireless technology. The pluggable transceiver modules 30 may thus be used for landline based subscriber connection and they may further include the necessary modem building blocks of the used technology, such as digital frontend DFE, analog frontend AFE, and line drivers LD. As indicated in FIGS. 10A to 11, the pluggable electrical transceiver modules 30 comprise a short electrical pigtail, i.e. electrical cables with twisted line pairs, and may terminate in electrical ports having a sealed enclosure due to the International Protection Class IP68, thus protecting the electrical splices where the pair of twisted copper lines or the coaxial lines leading to the subscriber premises are beginning.

The customer premise equipment of the customer comprises, in addition to the customer premise modem (for instance a VDSL modem with Ethernet connection to the residential gateway), a respective reverse power feeder for reverse-feeding electrical power, the amount of which is controlled by the power share controller 15 of the optical-electrical interface device 10. DPU wireless modules 43; 50 may be used as rural access points or for establishing high bandwidth point-to-point connections to the wireless modules at each customer premise, particularly in areas where no legacy copper wire infrastructure is present and/or where it is present but does not support sufficient bandwidth over the distance to be bridged for communication. The wireless modules 50 may particularly be connected to the interface device 10 via PCIe connections. For the wireless connections, any standard protocol may be used, such as WiFi 802.11 ac, ad or the like.

What is claimed:
1. An optical-electrical interface device for coupling to an optical distribution network, wherein the optical-electrical interface device comprises:
   a housing,
   an optical fiber port for coupling to a single optical fiber,
   an optical network terminal unit connected to the optical fiber port,
   a power sourcing management unit configured to manage the power supply of the optical network terminal unit,
   a plurality of electrical ports, and
   a plurality of electrical cables each connected to the power sourcing management unit and to one of the electrical ports,
wherein the optical network terminal unit and the power sourcing management unit are arranged inside the housing, whereas the electrical ports are accessible and/or arranged outside the housing,
wherein the optical-electrical interface device is configured to reverse-feed electrical power, from external electrical module devices connected to the electrical ports, for operating the optical network terminal unit,
wherein the power sourcing management unit is configured to calculate and/or control shares of electrical power received and/or to be received via the electrical cables from external electrical module devices, dependent on the number of external electrical module devices connected to one, some or all of the electrical ports; and wherein the optical-electrical interface device is configured to generate at least one control signal (CS; CSi) for power reverse-feeding electrical power to be received from devices plugged to the electrical ports, wherein the optical-electrical interface device is further configured to transmit the at least one control signal (CS; CSi), via at least one of the electrical cables to at least one of the electrical ports accessible outside the housing.

2. The optical-electrical interface device of claim 1, wherein each of the electrical cables passes through the housing so as to reach to the exterior of the housing.

3. The optical-electrical interface device of claim 1, wherein each respective electrical port is movably connected to the housing by means of a flexible, bendable and/or freely movable cable section of a respective electrical cable disposed outside the housing.

4. The optical-electrical interface device of claim 1, wherein the electrical cables, with their ends opposite to the electrical ports, are connected to the power sourcing management unit inside the housing and wherein the power sourcing management unit is connected to the optical network terminal unit by means of electrical conductor lines for feeding electrical power to the optical network terminal unit.

5. The optical-electrical interface device of claim 1, wherein the electrical cables comprise Ethernet cables and wherein the power sourcing management unit is configured to calculate and/or control the shares of electrical power to be reverse-fed, by means of the electrical cables, via Power-over-Ethernet.

6. The optical-electrical interface device of claim 1, wherein the optical-electrical interface device is configured for transmitting electrical high-frequency data signals between the optical network terminal unit and the electrical ports and wherein the optical-electrical interface device is configured for coupling to external electrical converter modules capable of converting electrical high-frequency data signals.

7. An optical-electrical interface device for coupling to an optical distribution network, wherein the optical-electrical interface device comprises:
   a housing,
   an optical fiber port for coupling to a single optical fiber,
   an optical network terminal unit connected to the optical fiber port,
   a power sourcing management unit configured to manage the power supply of the optical network terminal unit,
   a plurality of electrical ports, and
   a plurality of electrical cables each connected to the power sourcing management unit and to one of the electrical ports,
wherein the optical network terminal unit and the power sourcing management unit are arranged inside the housing, whereas the electrical ports are accessible and/or arranged outside the housing,
wherein the optical-electrical interface device is configured to reverse-feed electrical power, from external electrical module devices connected to the electrical ports, for operating the optical network terminal unit,
wherein the power sourcing management unit is configured to calculate and/or control shares of electrical power received and/or to be received via the electrical cables from external electrical module devices, dependent on the number of external electrical module devices connected to one, some or all of the electrical ports, and
wherein the optical-electrical interface device comprises further electrical cables connecting the optical network terminal unit to at least one or some of the electrical ports, wherein the further electrical cables are interconnected so as to bypass the power sourcing management unit.

8. The optical-electrical interface device of claim 7, wherein the further electrical cables and/or the optical network terminal unit are interconnected so as to transmit data signals of a protocol other than Ethernet.

9. An electrical module device for telecommunication or other communication and/or broad-band applications, wherein the electrical module device comprises:
   a housing,
   a first electrical port,
   a second electrical port and
   a first electrical route along which data is transmissible between the first electrical port and the second electrical port,
wherein the first electrical route at least partially extends through the housing,
wherein the electrical module device is configured to feed electrical power and/or a direct current bias voltage from the second electrical port to the first electrical port and
wherein the electrical module device further comprises a power feeding adjustment unit configured to adjust an amount, rate or share of electrical power, and/or a level of a direct current bias voltage, as a function of a control signal (CS; CSi) receivable via the first electrical port.

10. The electrical module device of claim 9, wherein the electrical module device is pluggable, by means of the first electrical port, to a further device, such as an optical-electrical interface device, for feeding the further device, with an amount, rate or share electrical power and/or with a direct current bias voltage, responsive to a control signal (CSi) received, via the first electrical port, from the further device.

11. The electrical module device of claim 9, wherein the power feeding adjustment unit comprises a second electrical route for at least locally de-routing a direct current bias voltage, inside the housing, from the first electrical route, wherein the power feeding adjustment unit comprises:
   a first power sourcing interface unit and a second power sourcing interface unit between which a direct current bias voltage to be received at the second electrical port is de-routed from the first electrical route and
   a DC/DC converter connected between the first and the second power sourcing interface unit and configured to transform a direct current bias voltage, responsive to a control signal (CS; CSi) to be received via a first electrical port and the first power sourcing interface unit, into an adjusted direct current bias voltage to be reverse-feed back to the first electrical port.

12. The electrical module device of claim 9, wherein the electrical module device is a converter module and comprises an electrical converter for converting a data format and/or a protocol of high-frequency signals, wherein the electrical converter is disposed in a section of the first electrical route bypassed by the second electrical route and/or bypassed by the power feeding adjustment unit.

* * * * *